US006985734B2

(12) United States Patent
Niska

(10) Patent No.: US 6,985,734 B2
(45) Date of Patent: Jan. 10, 2006

(54) TELECOMMUNICATIONS SYSTEM AND METHOD FOR IMPLEMENTING H. 248 MEDIA GATEWAYS WITHIN THIRD-GENERATION MOBILE ACCESS NETWORKS

(75) Inventor: Håkan Niska, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 483 days.

(21) Appl. No.: 09/969,364

(22) Filed: Oct. 1, 2001

(65) Prior Publication Data

US 2003/0064725 A1 Apr. 3, 2003

(51) Int. Cl.
*H04Q 7/20* (2006.01)

(52) U.S. Cl. .................... 455/445; 455/560; 370/351; 370/352; 370/401

(58) Field of Classification Search .............. 455/426.1, 455/445, 560, 432; 370/351, 352, 395.52, 370/401, 402
See application file for complete search history.

(56) References Cited

U.S. PATENT DOCUMENTS

| | | | | |
|---|---|---|---|---|
| 5,970,059 | A | | 10/1999 | Ahopelto et al. ........... 370/338 |
| 6,041,228 | A | * | 3/2000 | Niska et al. ................ 455/419 |
| 6,131,025 | A | * | 10/2000 | Riley et al. ............... 455/414.1 |
| 6,310,948 | B1 | * | 10/2001 | Nemeth ................... 379/213.01 |
| 6,370,385 | B1 | * | 4/2002 | Bohm et al. ................ 455/450 |
| 6,434,140 | B1 | * | 8/2002 | Barany et al. .............. 370/352 |
| 6,735,187 | B1 | * | 5/2004 | Helander et al. ........... 370/338 |
| 2001/0030954 | A1 | * | 10/2001 | Hameleers et al. ......... 370/338 |
| 2002/0051463 | A1 | * | 5/2002 | Higuchi ....................... 370/466 |
| 2002/0150084 | A1 | * | 10/2002 | Lee et al. .................... 370/352 |
| 2002/0186663 | A1 | * | 12/2002 | Stumpert et al. ............. 370/254 |
| 2003/0021222 | A1 | * | 1/2003 | Boer et al. .................. 370/216 |
| 2003/0031137 | A1 | * | 2/2003 | Mecklin Tomas ........... 370/252 |
| 2003/0169751 | A1 | * | 9/2003 | Pulkka et al. ............... 370/401 |

FOREIGN PATENT DOCUMENTS

| | | |
|---|---|---|
| EP | 0 766 490 A2 | 4/1997 |
| EP | 1 122 959 A1 | 8/2001 |
| WO | WO 99/16266 | 4/1999 |
| WO | WO 00/18154 | 3/2000 |
| WO | WO 01/13657 A1 | 2/2001 |
| WO | WO 01/58086 A2 | 8/2001 |

OTHER PUBLICATIONS

Amre El Hoiydi; "Radio Independence in the Network Architecture of the Universal Mobile Telcommunication System"; IEEE Globecom 1998, Sydney, Australia; Nov. 8–12, 1998; vol. 4; pp. 1957–1962.
Magnus Fyrö, Kai Heikkinen, Lars–Göran Petersen, and Patrik Wiss; "Media Gateway for Mobile Networks"; Ericsson Review, No. 4, 2000; pp. 216–223.
"Digital Cellular Telecommunications System (Phase 2+) (GSM); Universal Mobile Telecommunications System (UMTS); Network Architecture (3 GPP TS 23.002 version 4.3.0 Release 4)"; Jun. 2001; pp. 1–41.
EPO International Search Report dated Jun. 11, 2002.

* cited by examiner

*Primary Examiner*—William Trost
*Assistant Examiner*—James D Ewart

(57) ABSTRACT

A telecommunications system and method is disclosed for using H.248 Media Gateways within Access Networks of third-generation mobile systems. Each H.248 Access Network Media Gateway is capable of serving one or more radio servers of an Access Network, and one or more network servers of the Core Network. In addition, pools of devices (e.g., transcoders) can be shared between the radio servers and network servers. Furthermore, the Media Gateways within the Access Network can provide H.248 Virtual Gateways capable of serving the radio servers within two or more Access Networks and the network servers within the Core Network.

16 Claims, 4 Drawing Sheets

TELECOMMUNICATIONS SYSTEM AND METHOD FOR IMPLEMENTING H. 248 MEDIA GATEWAYS WITHIN THIRD-GENERATION MOBILE ACCESS NETWORKS

BACKGROUND OF THE PRESENT INVENTION

1. Field of the Invention

The present invention relates generally to third-generation mobile networks, and specifically to media gateways within third-generation mobile networks.

2. Description of Related Art

Third-generation mobile networks are described in the 3G TS 23.002 (3rd Generation Partnership Project; Technical Specification Group Services and System Aspects; Network architecture, Release 5) (hereinafter referred to as the Technical Specification). As described in the Technical Specification, third-generation mobile networks logically divide the infrastructure into a Core Network and an Access Network.

The basic Core Network is constituted of circuit-switched nodes, such as Mobile Switching Centers (MSCs), packet-switched nodes, such as General Packet Radio Service support nodes (SGSNs) and control nodes, such as Home Location Registers (HLRs). The basic Access Network is constituted of radio control nodes and radio access nodes. As an example, the radio control nodes may be Base Station Controllers (BSCs) for GSM (Global System for Mobile Communications) radio networks and Radio Network Controller (RNCs) for UMTS (Universal Mobile Telecommunications System) radio networks. As a further example, the radio access nodes may be Base Transceiver Stations (BTSs) for GSM radio networks and Node Bs for UMTS radio networks.

Third-generation mobile networks also partly utilize a layered network architecture. Call control and connectivity, which have traditionally been bundled in telecommunications networks, are now separate layers within the Core Network circuit-switched domain. This separation is achieved by dividing the MSCs into media gateways and network servers. The call control layer is resident in the MSC servers, while the connectivity layer is resident in the Media Gateways.

The Media Gateways serve to bridge the different transmission technologies and to add service to end-user connections. The Media Gateways use open interfaces to connect between the Core Network and an Access network. The media gateway control interface (H.248) facilitates this separation of call control and connectivity layers. Media Gateways are located within the Core Network as an interface to both the Access Networks and to legacy networks, such as the Public Switched Telephone Network (PSTN).

Recent advances in third generation mobile networks have made it possible to have each Media Gateway controlled by a single network server or multiple network servers. For example, as described in an article by Fryo et al. entitled "Media gateway for mobile networks," which was published in Ericsson Review No. 4 on Nov. 30, 2000, and which is hereby incorporated by reference, a single Media Gateway may be controlled by more than one network server within the Core Network by the use of Virtual Media Gateways within the Media Gateway. Each Virtual Media Gateway is controlled by one network server, with resources being shared by all of the Virtual Media Gateways.

However, by implementing the Media Gateways within the Core Network, call control and connectivity are not separated in the Access Network. Therefore, Media Gateways cannot be shared between the Access Network and the Core Network. In addition, for calls between Access Networks served by the same MSC server, physical transmission of payloads (e.g., speech or data) between the Access Networks and the Core Network is still required.

SUMMARY OF THE INVENTION

The present invention is directed to telecommunications systems and methods for using H.248 Media Gateways within the whole network (both Core Network and Access Network). The H.248 Access Network Media Gateways enable the separation of the call control and connectivity layers within the Access Network. Each H.248 Media Gateway is capable of serving one or more radio control servers of the Access Network and one or more network servers of the Core Network. In addition, pools of devices (e.g., transcoders) can be shared between the radio control servers and network servers.

Furthermore, the Media Gateways can provide H.248 Virtual Gateways capable of serving the radio control servers within two or more Access Networks and the network servers within the Core Network. In implementation, one or more H.248 Media Gateways can be placed at strategic locations at the border between two or more Access Networks. Therefore, physical transmission of payloads (e.g., speech or data) between the two different Access Networks is normally not required, logically defined only as interface terminations between the Virtual Gateways of the radio control servers and the network servers.

Furthermore, the Media Gateways within the Access Network can provide H.248 Virtual Gateways capable of serving the radio control servers within one or more Access Networks and the network servers within the Core Network. In implementation, one or more H.248 Media Gateways can be placed at strategic locations at the border between one or more Access Networks and an external network, such as the PSTN. Calls to PSTN subscribers can then normally be made as local PSTN calls.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE EXEMPLARY EMBODIMENTS

The numerous innovative teachings of the present application will be described with particular reference to the exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
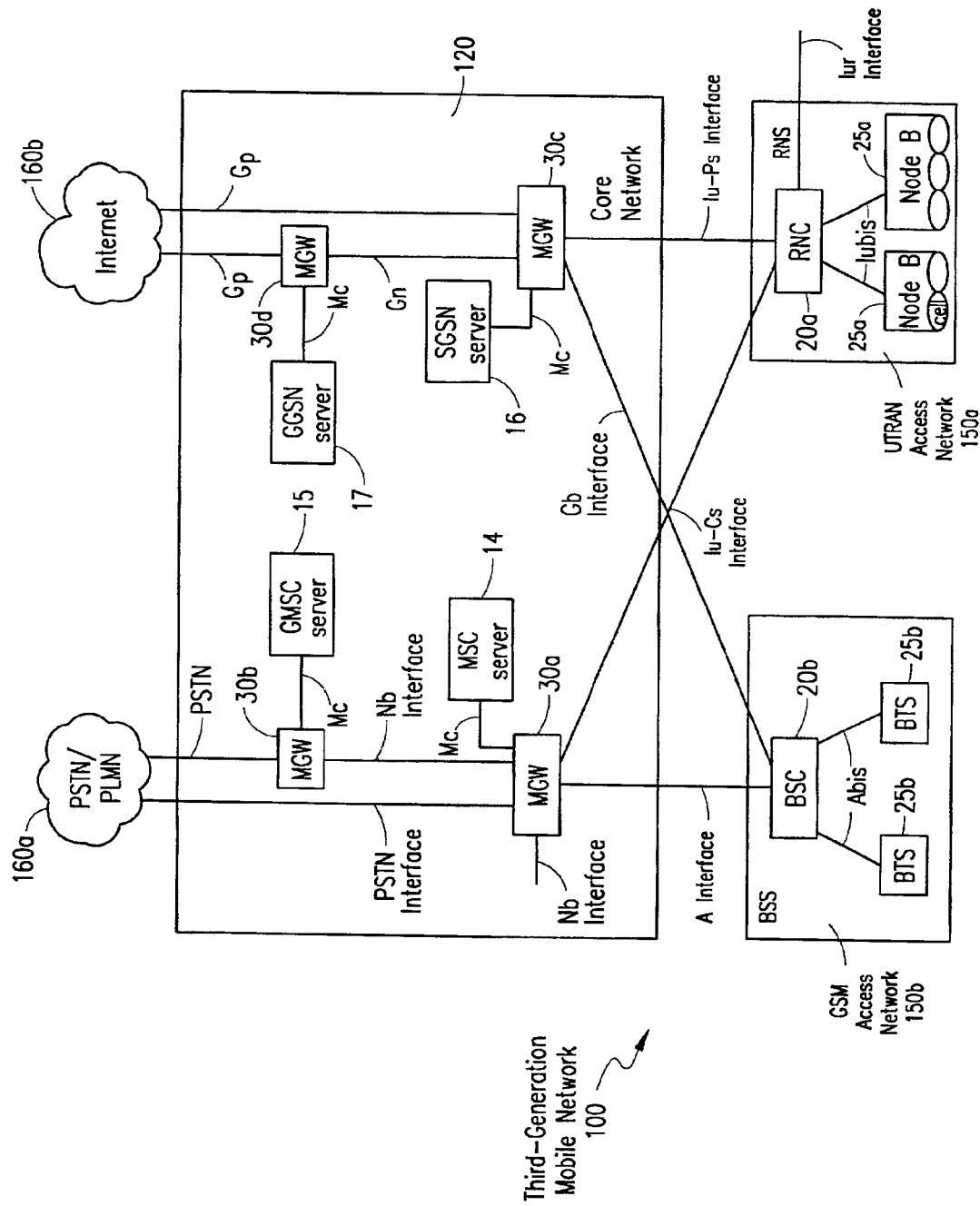
FIG. 1 is a block diagram illustrating a prior art third generation mobile network.

FIG. 1 shows a conventional third-generation mobile network 100, in which the call control and connectivity of the Core Network 120 have been separated into different layers. Within the third-generation mobile network 100, the switching fabric is removed from the MSC and placed in a Media Gateway (MGW) 30a. Thus, the MSC is divided internally, creating a MSC server 14 and a MGW 30a. Likewise, the Gateway MSC (GMSC) is divided internally, creating a GMSC server 15 and a MGW 30b. In addition, for packet data services, the serving General Packet Radio Service (GPRS) support node (SGSN) and the Gateway GPRS Support Node (GGSN) are both divided internally, creating a SGSN server 16, a GGSN server 17 and respective MGWs 30c and 30d for the SGSN server 16 and GGSN server 17.

The MGWs 30a–30d provide for interworking between an Access Network, such as the Universal Terrestrial Radio Access Network (UTRAN) 150a or GSM network 150b, and the Core Network 120. For example, MGWs 30a and 30b provide an interface for handling circuit-switched traffic between the Access Network 150a or 150b and an external network, such as the PSTN 160a. Likewise, MGWs 30c and 30d provide an interface for handling packet-switched traffic between the Access Network 150a or 150b and an external network, such as the Internet 160b.

The MGWs 30a–30d each have an H.248 control interface Mc that provides the signaling connection for user traffic control between the servers 14–17 and their respective MGWs 30a–30d. Signaling connections between the servers 14–17 and signaling connections between the servers 14–17 and the Access Networks 150a and 150b are not shown in FIG. 1, but the MGW's 30a–30d may route this signaling from the physical interfaces directly to the servers 14–17. The MGWs 30a–30d also includes a number of devices for various services, such as conference calling, announcements and transcoders (e.g., voice coders). In addition, MGWs 30a and 30b are interconnected with other MGWs for circuit-switched payload transmission between MSC/GMSC servers via the Nb interface.

As an example, in FIG. 1, a circuit-switched call between the UTRAN Access Network 150a and the PSTN 160a is interconnected by MGWs 30a and 30b. Speech originated by a mobile terminal (not shown) in wireless communication with a Node B 25a of the UTRAN Access Network 150a is transmitted to the Radio Network Controller (RNC) 20a of a Radio Network System (RNS) via the Iubis interface.

Thereafter, circuit-switched payloads are transmitted from the RNC 20a over the Iu-CS interface to the MGW 30a. The MGW 30a processes the payloads and provides the interface to the PSTN 160a via MGW 30b. The MSC server 14 and the GMSC server 15 provide the user traffic control for the circuit-switched call by controlling their respective MGWs 30a and 30b via H.248 control paths Mc. The MGWs 30a and 30b interconnect for routing of the payloads via interface Nb. It should be noted that the Iur interface connects two RNC's (only one of which is illustrated in FIG. 1).

As another example, within FIG. 1, a packet-switched call between the GSM Access Network 150b and the Internet 160b is interconnected by MGWs 30c and 30d. Packet data originated by a mobile terminal (not shown) in wireless communication with a Base Transceiver Station (BTS) 25b of the GSM Access Network 150b is transmitted to the Base Station Controller (BSC) 20b of a Base Station System (BSS) via the Abis interface.

Thereafter, packet-switched payloads are transmitted from the BSC 20b over the Gb interface to the MGW 30c. The MGW 30c processes the payloads and provides the interface to the Internet 160b via the Gp interface. The SGSN server 16 and the GGSN server 17 provide the user traffic control for the packet-switched call by controlling their respective MGWs 30c and 30d via H.248 control paths Mc, as described above. The MGWs 30c and 30d interconnect for routing of payloads via the Gn interface.

Figure 2:
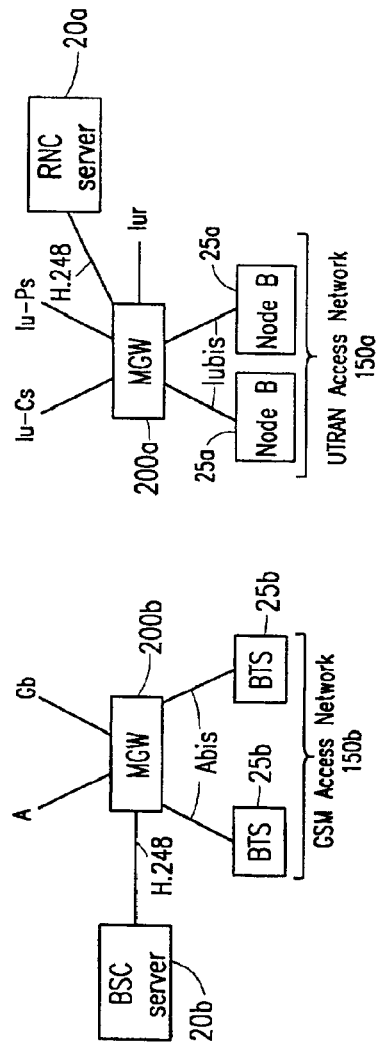
FIG. 2 is a block diagram illustrating the Access Network architecture in accordance with embodiments of the present invention.

As can be seen in FIG. 1, with conventional third-generation mobile networks, the call control and connectivity layers are not separated within the Access Network 150a and 150b. Therefore, Media Gateways 30a–d cannot be shared between the Access Network 150a and 150b and the Core Network 120. In a new Access Network architecture, as shown in FIG. 2 and in accordance with exemplary embodiments of the present invention, a new type of MGW (illustrated as 200a and 200b) can be implemented in each Access Network 150a and 150b, respectively, to serve as the interface directly between the Access Network 150a and 150b and the Core Network (not shown in FIG. 2).

Therefore, to separate call control and connectivity, in accordance with embodiments of the present invention, the RNC and BSC are divided internally, creating an RNC server 20a and an MGW 200a and a BSC server 20b and an MGW 200b. The MGWs 200a and 200b provide the Iubis and Abis interfaces to the base stations (Node B 25a and BTS 25b, respectively) of the two Access Networks 150a and 150b. In addition, MGWs 200a and 200b provides the A or Iu-Cs interfaces, respectively, to the Core Network (not shown) for circuit-switched traffic, and the Gb or Iu-Ps interfaces, respectively, to the Core Network for packet-switched traffic. The radio servers (e.g., RNC server 20a and BSC server 20b) provide the user traffic control for packet-switched and circuit-switched calls by controlling their MGWs 200a and 200b via respective H.248 control paths Mc. Signaling connections between radio servers and the base stations, and signaling connections between the radio servers and the Core Network are not shown in FIG. 2, but the MGWs 200a and 200b may route this signaling from the physical interfaces directly to the servers.

Figure 3:
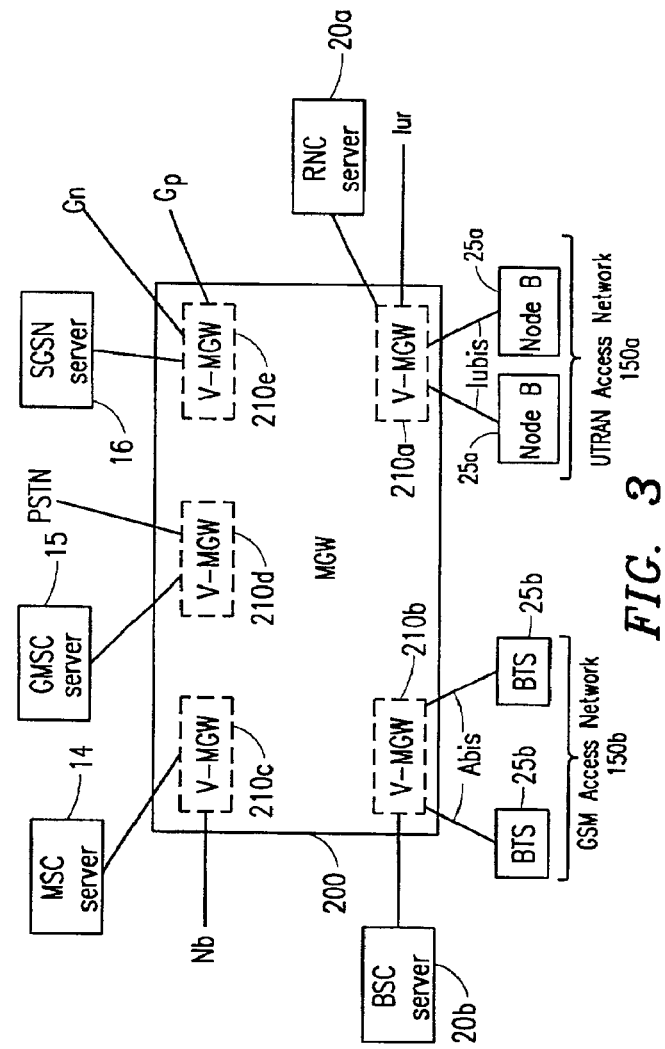
FIG. 3 is a block diagram of an exemplary Media Gateway including one or more Virtual Media Gateways for interfacing with Access Network servers and Core Network servers, in accordance with embodiments of the present invention.

In addition, in conventional third-generation mobile networks, as shown in FIG. 1, calls must always be routed through the Core Network 120 even when the call is between two Access Networks 150a and 150b served by the same MSC server 14. In order to more efficiently manage the load within the Core Network 120, referring now to FIG. 3, this new type of MGW 200 can also provide the interface between two or more Access Networks 150a or 150b and between an Access Network 150a or 150b and an external network, such as the PSTN or Internet. Therefore, the MGW 200 can be controlled by more than one server via the use of Virtual Media Gateways 210. As shown in FIG. 3, the RNC server 20a, BSC server 20b, MSC server 14, GMSC server 15 and SGSN server 16 can all interconnect with the MGW 200 for control of payload traffic (circuit-switched and packet-switched).

In order for each server (radio and network) to control payloads routed between an Access Network and an external network, the MGW 200 maintains a separate Virtual MGW 210 for each server. For example, to perform the protocol conversion between the two Access Networks 150a and 150b, the RNC server 20a and BSC server 20b each control separate Virtual MGWs 210a and 210b, respectively, within the MGW 200. In addition, the MSC server 14, GMSC server 15 and SGSN server 16 each maintain control of a Virtual MGW 210c, 210d and 210e, respectively, within the MGW 200 for interconnecting with the legacy networks (e.g., PSTN/PLMN and Internet).

Separate H.248 interfaces Mc between the MGW 200 and the servers provide the user traffic control, while separate physical connections (e.g., Gn interface, Gp interface, PSTN interface, Nb interface, Abis interface, Iubis interface and Iur interface) to each of the Access Networks 150 and the legacy networks 160 provide the payload connectivity. Therefore, physical transmission of payloads between the RNC 20a, BSC 20b and the Core Network is no longer required, logically being defined only as interface terminations between the Virtual MGWs (i.e., between Virtual MGW 210a and Virtual MGW 210c, between Virtual MGW 210a and Virtual MGW 210e, between Virtual MGW 210b and Virtual MGW 210c, and between Virtual MGW 210b and 210e). In addition, resources (e.g., transcoders) in the MGW 200 can be shared between the Virtual MGWs 210. Furthermore, one or more of such MGWs 200 may be placed at strategic locations at the borders between two or more Access Networks 150a and 150b to provide the connectivity between multiple Access Networks 150a and 150b and multiple radio servers 20a and 20b within each of the Access Networks 150a and 150b.

It should be understood that any type of Access Network 150 and any number of Access Networks 150 can be served by the MGW 200 shown in FIG. 3. As an example, in the MGW 200 of FIG. 3, the GSM Access Network 150b and the UTRAN Access Network 150a are interconnected via the MGW 200. The MGW 200 provides the connectivity between the GSM Access Network 150b and the UTRAN Access Network 150a by converting between protocols used in each of the Access Networks 150a and 150b.

For example, the GSM Access Network 150b currently uses compressed speech transmitted over circuits. In the future, the GSM Access Network 150b may transmit speech as IP packets. However, the UTRAN Access Network 150a uses compressed speech transmitted over an ATM network. The MGW 200 allows speech to be easily routed between the two Access Networks 150a and 150b by converting circuit-switched compressed speech into ATM-switched compressed speech and vice-versa.

Figure 4:
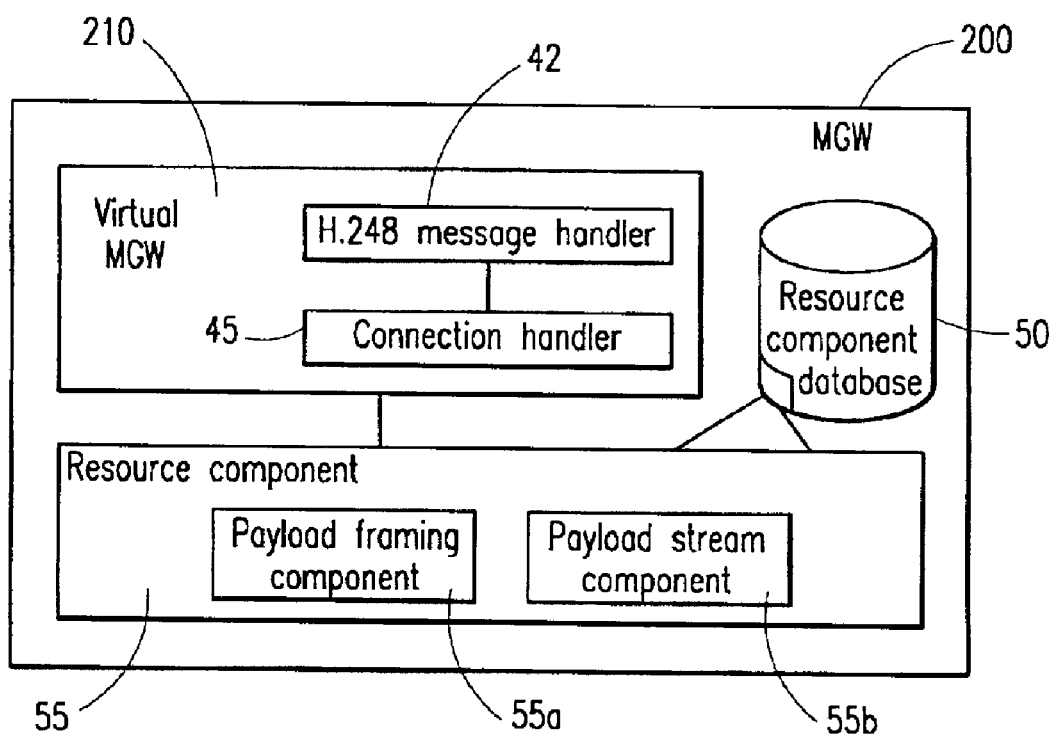
FIG. 4 is a block diagram of the components of the Media Gateway and Virtual Media Gateways shown in FIG. 3.

A detailed view of the functional architecture of the MGW 200 and Virtual MGWs 210 is shown in FIG. 4. All Virtual MGWs 210 are capable of sharing resource components 55 (e.g., transcoders) available from a resource component database 50. However, resource components 55 can also be preconfigured, by identity and type, for any Virtual MGW 210 and stored within the resource component database 50.

An H.248 message received at the MGW 200 is processed by an H.248 message handler 42 for the appropriate Virtual MGW 210. A connection handler 45 within the Virtual MGW 210 establishes a connection between the Virtual MGW 210 and another Virtual MGW (not shown) and allocates available resource components 55 according to the resource component database 50.

Resource components 55 (e.g., transcoders) are composed of payload framing components 55a and payload stream components 55b. Payload framing components 55a terminate different protocol layers (e.g., IP, user datagram protocol (UDP) and real-time transport protocol (RTP)) and convert the protocols between the different Access Networks or between an Access Network and the Core Network. Payload stream components 55b process the actual speech or data.

Figure 5:
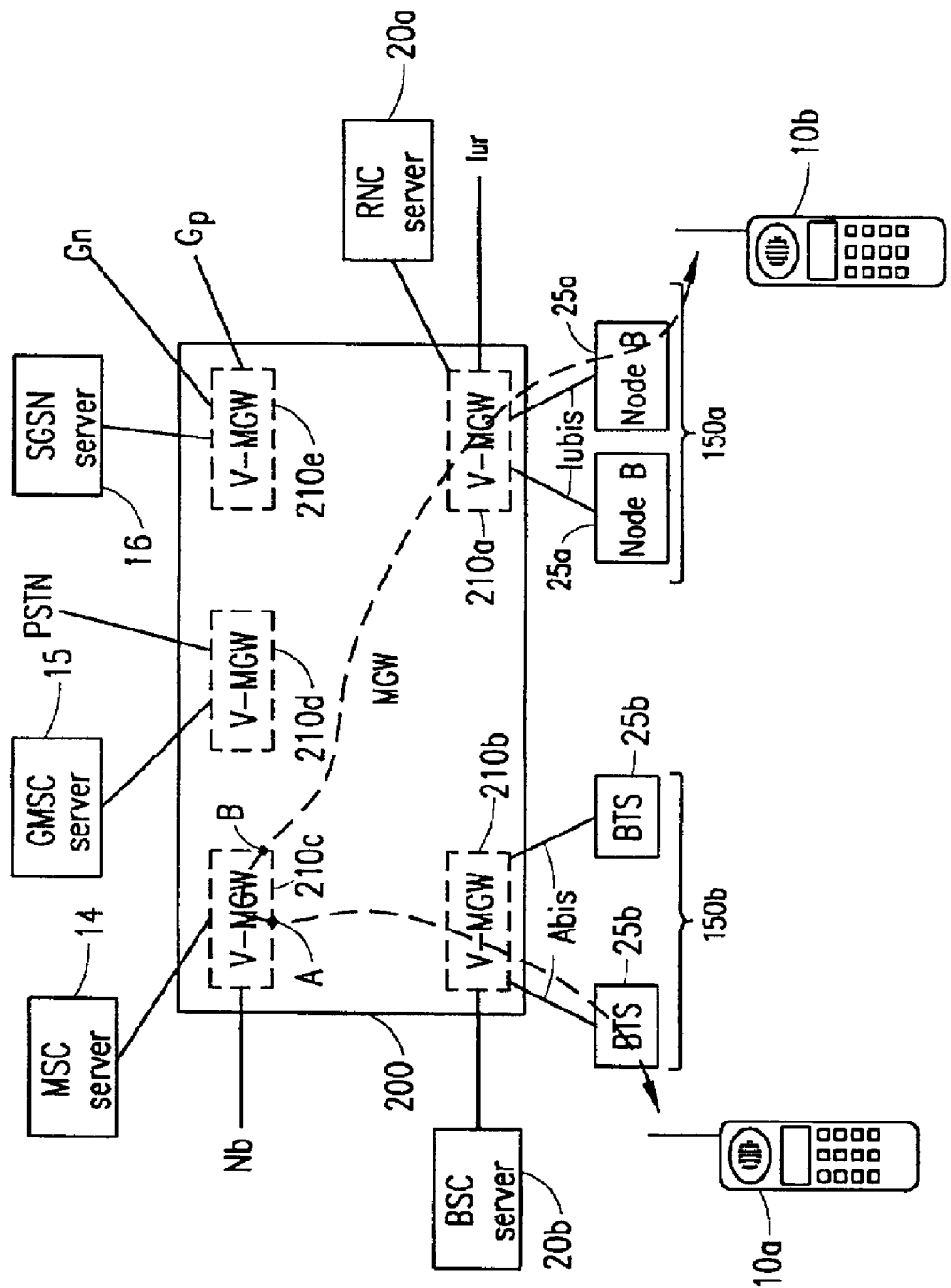
FIG. 5 is an example of a call connection between two Access Networks using the Virtual Media Gateways shown in FIGS. 3 and 4.

FIG. 5 illustrates a call between one Access Network 150b (i.e., GSM) and another Access Network 150a (i.e., UTRAN) using the Virtual MGWs 210 shown in FIGS. 3 and 4. During the establishment phase of a mobile originated call within the GSM Access Network 150b, the calling mobile terminal 10a sends a call set up request and the B-number of a called mobile terminal 10b to the MSC server 14. The call control signaling between the BTS 25b, BSC server 20b and MSC server 14 are well-known in the art, and will not be described in detail herein.

Upon receipt of the call setup request, the MSC server 14 reserves a connection point A in the Virtual MGW 210c. The connection point A is associated with the Virtual MGW 210b for the BSC server 20b. The MSC server 14 also instructs the BSC server 20b to establish a connection for the calling mobile terminal 10a to point A in Virtual MGW 210c. In response, the BSC server 20b allocates a speech channel to the calling mobile terminal 10a and orders the Virtual MGW 210b to connect the allocated speech channel to point A in the Virtual MGW 210c.

To connect the call to the called mobile terminal 10b, the MSC server 14 analyzes the B-number of the called mobile terminal 10b and locates the called mobile terminal 10b (i.e., by interrogating a Home Location Register). Upon determining that the called mobile terminal 10b is registered in the Visitor Location Register (VLR) of the MSC server 14 and within the UMTS Access Network 150a, the MSC server 14 pages the called mobile terminal 10b in the UMTS Access Network 150a. When the called mobile terminal 10b responds to the page, the MSC server 14 selects a connection point B in the Virtual MGW 210c that is associated with the Virtual MGW 210a.

Thereafter, the MSC server 14 requests the RNC server 20a to establish a connection for the called mobile terminal 10b to point B in Virtual MGW 210c. In response, the RNC server 20a allocates a speech channel to the called mobile terminal 10b and orders the Virtual MGW 210a to connect the allocated speech channel to point B in the Virtual MGW 210c.

The connection handler within the Virtual MGW 210c of the MSC server 14 establishes a connection between the Virtual MGW 210b of the BSC server 20b and the Virtual MGW 210a of the RNC server 20a. Once the connection is established, payloads can be transmitted between the BTS 25b and the MGW 200 over the Abis interface and between the MGW 200 and the Node B 25a over the Iubis interface to connect the call between the calling mobile terminal 10a and the called mobile terminal 10b. The call is controlled via the H.248 interfaces of the RNC server 20a, the BSC server 20b and MSC server 14. Advantageously, resources (e.g., transcoders) can be shared between the two Access Networks 150a and 150b.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A mobile telecommunications system, comprising:
    a radio server within an access network of a third-generation telecommunications system for providing call control of calls within said access network;

a media gateway for providing connectivity of calls within said access network, said media gateway comprising:
an H.248 interface to said radio server for handling the user traffic control;
a physical connection to at least one base station within said access networks for handling the call connectivity to and from said Access Network; and
two or more virtual media gateways, a first one of said two or more virtual media gateway being associated with said radio server and a second one of said two or more virtual media gateways being associated with network server within said core network, wherein each of said two or more virtual media gateways has a connection handler therein, said connection handler of said first or second virtual media gateway, establishes a connection between said first virtual media gateway and said second virtual media gateway for converting payloads between said first and second virtual media gateways for a call in response to receiving an H.248 message; and
a database housing resource components, each of said two or more virtual media gateways being capable of sharing said resource components within said database.

2. The telecommunications system of claim 1, wherein said media gateway further has an H.248 interface to at least one core network server within a core network for handling the call connectivity control between said access network and said at least one core network server and at least one physical connection to other nodes within said core network or to one or more external networks for handling the call connectivity between said access network and said core network or between said access network and said one or more external networks.

3. A media gateway for interconnecting two or more mobile access networks, comprising:
a first virtual media gateway associated with a first one of said two or more mobile access networks, said first virtual media gateway having an H.248 interface to a radio server within said first mobile access network for handling the user traffic control and a physical connection to at least one base station within said first access network for handling the call connectivity to and from said first access network;
a second virtual media gateway associated with a second one of said two or more mobile access networks, said second virtual media gateway having an H.248 interface to a radio server within said second mobile access network for handling the user traffic control and a physical connection to at least one base station within said second access network for handling the call connectivity to and from said second access network; and
a third virtual media gateway having an H.248 interface to at least one core network server within a core network for handling the connectivity control between said two or more mobile access networks and said core network, said first and second virtual media gateways being interconnected via said third virtual media gateway.

4. The media gateway of claim 3, wherein each of said virtual media gateways has a connection handler therein capable of establishing a connection between said first virtual media gateway and said second virtual media gateway via said third virtual media gateway in order to convert payloads between said virtual media gateways for a call.

5. The media gateway of claim 4, further comprising:
a database housing resource components, said virtual media gateways being capable of sharing said resource components within said database.

6. The media gateway of claim 5, wherein said connection handlers are further capable of allocating available ones of said resource components from said database for said call.

7. The media gateway of claim 5, wherein said resource components comprise one or more transcoders.

8. The media gateway of claim 5, wherein said resource components comprise payload framing components and payload stream components.

9. The media gateway of claim 5, wherein at least one of said two or more access networks maintains separate resource components within said database for use by said respective first or second virtual media gateway.

10. The media gateway of claim 3, wherein one of said two or more access networks is a Universal Terrestrial Radio Access Network.

11. The media gateway of claim 3, wherein one of said two or more access networks is a Global System for Mobile Communications Network.

12. A method for establishing a call connection between a first mobile access network and a second mobile access network, comprising:
receiving a message at a network server within a core network to setup said call connection;
establishing a logical connection between a first virtual media gateway associated with said first mobile access network and a second virtual media gateway controlled by said network server;
establishing a logical connection between said second virtual media gateway and a third virtual media gateway associated with said second mobile access network;
allocating resource components from a database within said media gateway for said call connection; and
establishing a physical connection between a base station of said first mobile access network and said first virtual media gateway and between said third virtual media gateway and a base station of said second mobile access network for transmission of payloads during said call connection.

13. The method of claim 12, wherein said step of establishing a connection between said first and second virtual media gateways comprises:
reserving a connection point in said second virtual media gateway associated with said first virtual media gateway.

14. The method of claim 13, wherein said step of establishing a connection between said second and third virtual media gateways comprises:
reserving a connection point in said second virtual media gateway associated with said third virtual media gateway.

15. The method of claim 12, wherein said step of allocating said resource components further comprises:
sharing said resource components between said virtual media gateways.

16. The method of claim 12, wherein said step of allocating said resource components further comprises:
allocating separate ones of said resource components for said first and third virtual media gateways.

* * * * *